No. 639,576. Patented Dec. 19, 1899.
F. HURLBUT.
SYRINGE NOZZLE.
(Application filed Mar. 9, 1899.)
(No Model.)
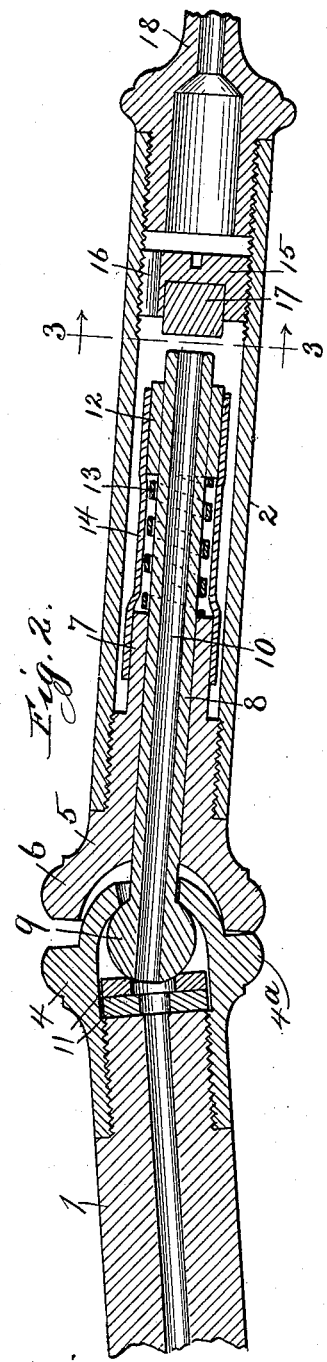
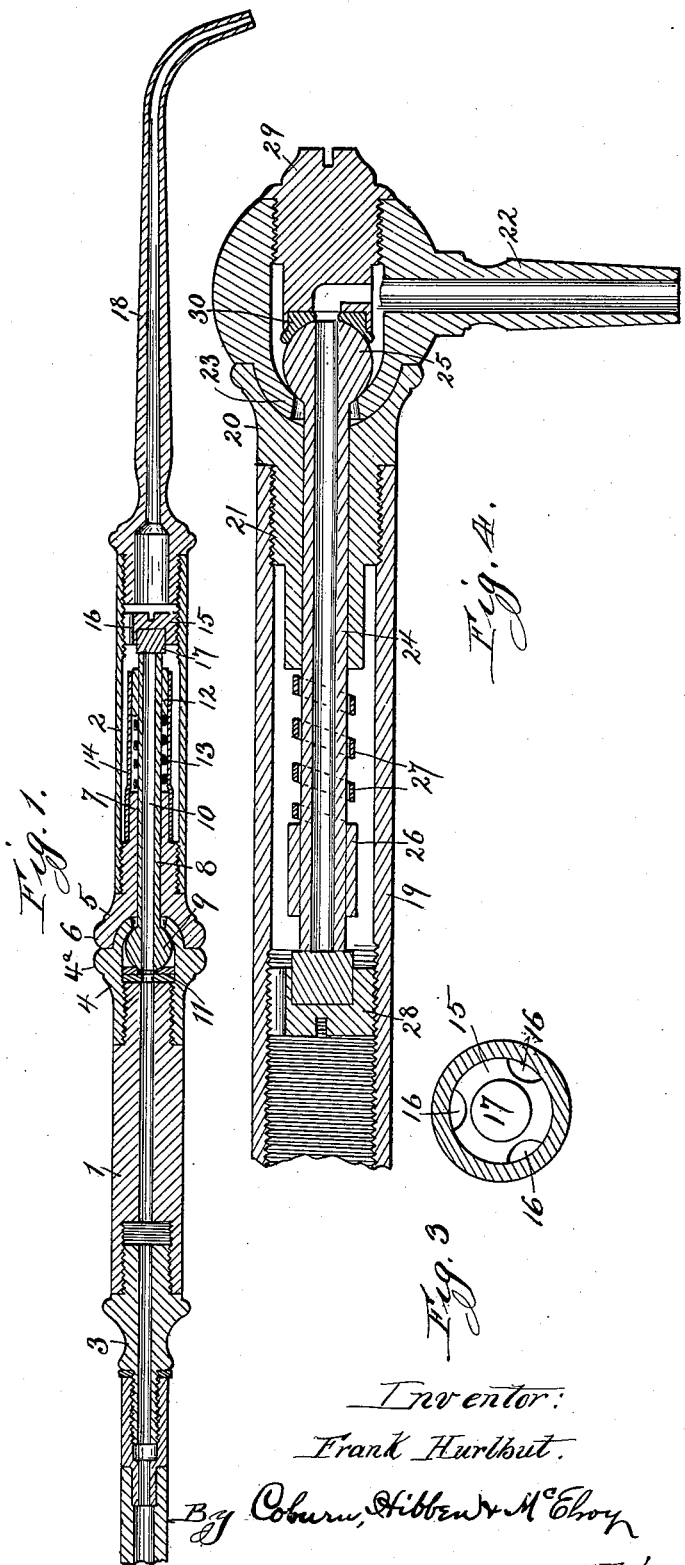
Witnesses:
R. J. Jaeller,
L. E. Serage
Inventor:
Frank Hurlbut.
By Coburn, Hibben & McElroy
Attys.

UNITED STATES PATENT OFFICE.

FRANK HURLBUT, OF CHICAGO, ILLINOIS.

SYRINGE-NOZZLE.

SPECIFICATION forming part of Letters Patent No. 639,576, dated December 19, 1899.

Application filed March 9, 1899. Serial No. 708,350. (No model.)

*To all whom it may concern:*

Be it known that I, FRANK HURLBUT, residing at Chicago, in the county of Cook and State of Illinois, have invented certain new and useful Improvements in Syringes, Sprays, &c., of which the following is a specification.

My invention relates to syringes or ejectors and the like in which fluid under pressure is employed, such as are used for dental purposes and also for spraying.

My object is to provide an instrument having a valve device governing the flow of fluid-pressure and which can be easily actuated by the operator by a simple movement or pressure of the hand when a flow of fluid-pressure is desired.

In the accompanying drawings, Figure 1 is an enlarged sectional view of the instrument used as a syringe for dental purposes; Fig. 2, a section of a part of the same drawn on a still larger scale, showing the joint in such instrument "broken" and the valve thereby opened; Fig. 3, a sectional plan view of a screw-plug valve-seat, taken on line 3 of Fig. 2; and Fig. 4, a sectional elevation of a spraying attachment, showing my device applied thereto.

The instrument is made in two parts or sections 1 and 2, each provided with a preferably central bore and jointed or connected together in a novel manner. The section 1 is screw-threaded at its outer end to receive an end piece 3, which may be attached in any suitable manner to a supply of fluid under pressure, such as air or water. The other end of the section has a ball-shaped head 4, preferably provided with a flange 4ª, and which is received by a socket-piece 5 on the section 2. This socket preferably has a flange 6 and is preferably screw-threaded upon its stem 7, so that it may be screwed into section 2. The forward end of this stem is of reduced diameter and extends within the hollow section 2. A valve-stem 8, having a ball-head 9 and a passage 10, forms the valve device and the connection or conduit at the joint between the sections. This stem fits snugly in the stem 6 and has a movement therein. The head 9 is arranged within the hollow ball-shaped head 4, and between it and the end of section 1 are arranged washers 11, preferably of some elastic material and having holes to form a continuation of the passage or conduit. Upon the forward part of the stem 8 is a sleeve 12, soldered or otherwise secured thereto, and a suitable coiled spring 13 is arranged around such stem, abutting at one end against the sleeve and at the other end against the stem 7, so that all tendency of movement of stem 8 is resisted by the spring and the parts restored thereby after movement of the parts. A small piece of rubber piping 14 or the like is preferably slipped over the sleeve 12, spring 13, and stem 7 to prevent leakage of fluid under pressure around the spring and between stem 8 and the head-piece 5. The section 2 is preferably screw-threaded to receive a screw-plug 15, having a series of grooves or ports 16 for the passage of fluid. This plug has a piece 17, preferably of rubber, arranged on its inner face, which forms a valve-seat for the end of the stem or valve device 8. A suitable nozzle 18 is adapted to screw into the section 2, as shown.

The instrument being attached to any supply of fluid under pressure—air or water or other liquid—the passage or conduit is normally closed or interrupted at the valve-seat 17, inasmuch as the spring restores the sections to their normal position of alinement, whereupon the valve is seated. When, however, the joint in the instrument is broken, as seen in Fig. 2, caused by the pressure of the hand and the rocking on each other of the flanges 4ª and 6, the valve-stem will be drawn from its seat and the fluid permitted to flow through the ports and passages in the plug and through the nozzle to the place of application. In thus breaking the joint the relative position of the sections is changed from normal by a movement of one section with respect to the other in a plane parallel to the longitudinal axis of the pipe or passage. This breaking of the joint is easily and readily done by the pressure of the hand which holds the instrument, and the use of valves, &c., requiring separate manipulation, is thereby avoided. The stems 7 and 8 slide on each other, the stem 8 moving against the tension of spring 13, which restores the sections to axial alinement when the pressure of the hand is relaxed. The screw-plug can be adjusted in or out to form a perfect valve-seat when the parts are in their normal position.

While the valve is shown on the side of the joint toward the nozzle, a reversal of this stem and valve and the immediate parts is obvious and within the scope of my invention and claims, which contemplate any valve device operated by breaking a joint in the instrument. Such reversal of parts is illustrated in the modified form shown in Fig. 4.

In Fig. 4 is shown the particular adaptation of my device for use with spraying devices—such as, for instance, the well-known Davidson spray. The construction and relation of the parts and their operation are similar to those shown in the other figures. The cylindrical section 19 has a socket-piece 20, provided with a stem 21, extending within such section. The nozzle-section 22 has a ball-shaped portion 23 fitting said socket. A valve-stem 24 has the ball-shaped head 25 within the ball 23 and fitting closely within the hollow stem 21. A sleeve 26 is secured to the stem 24, and a spring 27, coiled around such stem, abuts at one end against this sleeve and at the other end against stem 21. The screw-plug 28 forms the valve-seat. A plug 29 screws into the nozzle-section and holds a piece of elastic packing 30 against the ball-shaped head 25. This packing and plug have suitable holes to provide a free passage through the nozzle, which is attachable or insertible in the spraying device. It is obvious that when the nozzle and the section 19 are pressed toward each other the joint at the ball-and-socket section is broken and the stem 24 lifted from its seat in a manner similar to the other form of device.

Although I have described more or less precise forms and details of construction, I do not intend to be understood as limiting myself thereto, as I contemplate changes in form, the proportion of parts, and the substitution of equivalents as circumstances may suggest or render expedient and without departing from the spirit of my invention.

While I have shown and described a ball-and-socket joint for the pipe or conduit which is preferable because it permits of the flexing of the conduit in any direction, it will be understood that I do not limit myself to such joint, as any means whereby the valve device within the conduit may be unseated to admit fluid under pressure are included within the scope and meaning of my invention and claims. Furthermore, I do not limit myself to the particular employment of my invention as herein shown and described, but contemplate using the same wherever applicable.

I claim—

1. In an ejector, the combination of a conduit, a normally seated or closed valve located therein and movable in the longitudinal axis thereof, and means operated by the bending of one part of the conduit relative to another part thereof, whereby the valve is automatically opened, by withdrawal at substantially right angles from its seat and when the parts are permitted to resume their normal relative position the valve is automatically closed.

2. In an ejector, the combination of a conduit for the passage of fluid under pressure, one part of which conduit is movable with relation to the other part, a normally seated or closed valve in said conduit and movable in the longitudinal axis thereof, and means operated by said movable part of the conduit when its normal relative position is changed whereby the valve is automatically opened by withdrawal at substantially right angles from its seat and when the parts are permitted to resume their normal relative position the valve is automatically closed.

3. In an ejector, the combination of a conduit for the passage of fluid under pressure, one part of which conduit is movable with relation to the other part, a normally-closed valve in one of said parts and having a stem extending in the other said part whereby the valve-stem may be actuated to open the valve by varying the normal relative positions of said parts of the conduit and an adjustable valve-seat for said valve.

4. In an ejector, the combination of a jointed conduit formed of two separate sections for the passage of fluid under pressure and having one part or section movable at the joint upon the other, a normally-closed valve in one of said sections and having a stem extending across said joint and into the other section whereby the valve-stem may be actuated to open the valve by varying the normal relative positions of said sections.

5. In an ejector, a pipe forming a passage for fluid under pressure and made in two sections with a flexible connection, in combination with a valve device consisting of a hollow stem passing through said connection and normally seated to close the passage, and means operated by the flexing of one section relative to the other, whereby the valve is automatically opened and when the sections are permitted to resume their normal position the valve is automatically closed.

6. In an ejector, a pipe forming a passage for fluid under pressure and made in two sections with a ball-and-socket connection, in combination with a valve consisting of a hollow stem passing through said connection and normally seated to close the passage, and means operated by the flexing of one section relative to the other, whereby the valve is automatically opened and when the sections are permitted to resume their normal position the valve is automatically closed.

7. In combination with a flexible conduit for the passage of fluid under pressure, valve mechanism normally closing the conduit, an adjustable valve-seat in such conduit and means operated by the flexing of the conduit for automatically actuating the valve mechanism and thereby opening the conduit.

8. In combination with a conduit formed in two sections normally in alinement, a normally-closed valve in one section and movable in the longitudinal axis of said conduit, and means operated by the bending of one section out of said alinement whereby said valve is opened and when the sections are permitted to resume their normal relative position the valve is automatically closed.

9. A pipe forming a passage for the fluid under pressure and made in two sections, one of which has a hollow ball-shaped end and the other of which has a socket to form a ball-and-socket joint, a hollow stem having a ball at one end received within said hollow ball-shaped end and passing through said joint, a valve-seat arranged within the passage and on which the end of the stem is normally seated but unseated therefrom when one section is moved with respect to the other.

10. A pipe or tube forming a passage for fluid under pressure and made in two sections, a hollow ball-shaped piece on the end of one section, a socket-shaped piece secured in the adjacent end of the other section and having an inwardly-projecting extension, a hollow stem having a ball at one of its ends received within said ball-shaped piece and fitting within said extension, a projection on the end of such stem, a spring abutting at one end against such projection and at the other end against such extension and a valve-seat on which such stem is normally seated.

11. A pipe forming a passage for fluid under pressure and made in two sections with a ball-and-socket joint, in combination with a valve normally closing such passage and an adjustable valve-seat in such passage.

12. A valve device for governing the flow of fluid through a flexible passage comprising a hollow valve-stem within such passage, and a seat upon which such stem is normally seated whereby when flexed the stem is lifted from its seat and the passage is opened.

13. A pipe forming a passage for fluid under pressure and made in two sections with a ball-and-socket joint or connection, in combination with a hollow valve-stem passing through said joint and continuing said passage thereacross, and an adjustable plug arranged in the passage of one section and provided with ports and also with a valve-seat on its inner face on which said stem seats.

14. A pipe or tube forming a passage for fluid under pressure and made in two sections with a ball-and-socket joint, ball-and-socket end pieces, respectively, on the meeting ends of the sections, the socket-section having a hollow inwardly-projecting stem, a hollow valve-stem passing through said joint and fitting in the projecting stem, a sleeve on the end of the valve-stem, a valve-seat within said passage, and a spring interposed between such sleeve and the end of the projecting stem to normally hold the valve-stem seated.

15. A pipe or tube forming a passage for fluid under pressure and comprising sections 1 and 2, the former having a hollow ball-shaped end piece 4 provided with a flange $4^a$ and the latter having a socket-shaped end piece 5 provided with a flange $5^a$ and a stem 7, a spring-pressed valve-stem 8 having a ball-shaped head 9 within piece 4 and a valve-seat within said passage.

FRANK HURLBUT.

Witnesses:
SAMUEL E. HIBBEN,
LOUISE E. SERAGE.